United States Patent
Squilla et al.

(10) Patent No.: US 6,396,537 B1
(45) Date of Patent: May 28, 2002

(54) PHOTOGRAPHIC SYSTEM FOR ENABLING INTERACTIVE COMMUNICATION BETWEEN A CAMERA AND AN ATTRACTION SITE

(75) Inventors: John R. Squilla; Omid A. Moghadam; James D. Allen, all of Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 08/977,383

(22) Filed: Nov. 24, 1997

(51) Int. Cl.[7] .......................... H04N 5/76; H04N 5/262; H04N 7/14

(52) U.S. Cl. ................ 348/239; 348/14.02; 348/164; 348/232; 348/584; 396/56; 396/311

(58) Field of Search ................ 345/433, 435, 345/473; 348/14.01, 14.02, 14.03, 14.07, 207, 222, 239, 584, 586, 589, 598, 600, 231–233; 396/2, 3, 429, 56, 57, 310, 311, 321; H04N 5/262, 7/14, 5/76

(56) References Cited

U.S. PATENT DOCUMENTS

| | | | |
|---|---|---|---|
| 4,524,381 A | | 6/1985 | Konishi ........................ 358/29 |
| 4,574,319 A | | 3/1986 | Konishi ....................... 358/335 |
| 4,957,348 A | | 9/1990 | May ............................ 350/321 |
| 5,194,892 A | | 3/1993 | Robison ....................... 355/40 |
| 5,264,822 A | | 11/1993 | Vogelman et al. ...... 340/286.01 |
| 5,296,884 A | | 3/1994 | Honda et al. ................ 354/106 |
| 5,479,228 A | | 12/1995 | Tamamura et al. .......... 354/106 |
| 5,488,558 A | * | 1/1996 | Ohki ........................... 701/207 |
| 5,577,179 A | * | 11/1996 | Blank .......................... 345/435 |
| 5,606,365 A | | 2/1997 | Maurinus et al. ........... 348/222 |
| 5,806,005 A | * | 9/1998 | Hull ......................... 348/14.12 |
| 5,842,131 A | * | 11/1998 | Yamane ....................... 455/566 |
| 5,917,542 A | * | 6/1999 | Moghadam .................. 348/207 |
| 6,000,864 A | * | 12/1999 | Hanada ........................ 400/62 |
| 6,011,547 A | * | 1/2000 | Shiota ......................... 345/327 |
| 6,018,774 A | * | 1/2000 | Mayle ......................... 709/250 |
| 6,035,142 A | * | 3/2000 | Schrock ...................... 396/310 |
| 6,069,712 A | * | 5/2000 | Dellert ........................ 358/408 |
| 6,133,947 A | * | 10/2000 | Mikuni ....................... 348/143 |
| 6,141,482 A | * | 10/2000 | Massarsky .................... 386/46 |

FOREIGN PATENT DOCUMENTS

EP 0 640 938 A2 3/1995 .......... G06K/17/00

OTHER PUBLICATIONS

U.S. application No. 08/707,265, Allen et al., filed Sep. 3, 1996.

* cited by examiner

*Primary Examiner*—Wendy R. Garber
*Assistant Examiner*—Ngoc-Yen Vu
(74) *Attorney, Agent, or Firm*—David M. Woods

(57) ABSTRACT

A photographic system involves the collection of data from a scene, e.g., a visitor attraction site, that is capable of interactive communication with a user. The attraction site stores content data related to the site, and the user communicates with the attraction site through a camera capable of communication with the site. Besides capturing an image associated with the site, the camera stores predetermined personality data that relates an interest of the user to at least a portion of the content data and includes means for transferring the personality data to the attraction site. The camera further includes means for receiving and displaying the portion of the content data from the attraction site, and a user interface for selecting from the displayed content data that part which the user wants to keep. In this manner, information relevant to a user's interests about a photographed item can be easily requested, accessed and stored with the specific pictures that the user has captured.

14 Claims, 7 Drawing Sheets

PHOTOGRAPHIC SYSTEM FOR ENABLING INTERACTIVE COMMUNICATION BETWEEN A CAMERA AND AN ATTRACTION SITE

FIELD OF THE INVENTION

The invention relates generally to the field of photography, and in particular to a photographic system including a camera that is capable of interactive data communication with sources of digital data associated with one or more scenes.

BACKGROUND OF THE INVENTION

It is known in the art that a film or an electronic camera can record image information on either a film or store the information in electronic memory. It is also known in the art that a wireless transceiver can be used to transmit and receive data. An example of such a device is shown in U.S. Pat. No. 4,957,348. Digital cameras also have the capability of storing additional information along with the image. An example of a digital camera with such capability is the Kodak DCS 460 Digital Camera, which is capable of storing voice annotation and Global Positioning System (GPS) parameters along with the digital image. Moreover, the film used by the Advanced Photo System™, sold by Eastman Kodak Company and referred to as Advantix™ film, allows a camera to store digital information on a clear magnetic layer on the back of the photographic film. This feature is disclosed in U.S. Pat. No. 5,194,892.

U.S. Pat. No. 5,296,884 discloses a camera that can receive location coordinates, such as GPS signals, from a wireless source, and then convert that information to a location name such as a name of a city. The city name is then printed on the photograph after it has been processed. U.S. Pat. No. 5,479,228 discloses a camera system with memory that can store a set of optional phrases such as "Happy New Year" and "Happy Birthday" which can be stored on the magnetic layer of Advantix™ film and printed on the photograph during the processing operation.

Ser. No. 08/707,265, entitled "Tradeshow Photographic and Data Transmission System", and filed on Oct. 15, 1996 now U.S. Pat. No. 5,768,633 in the names of the same inventors and the same assignee as the present application, discloses a photographic and data transmission system including two main parts. The first part is a wireless communication system installed at a booth in a tradeshow for transmitting wireless information related to a product on display, such as the product name, company name, price and the Uniform Resource Locator (URL) address of the product source on the internet system. The other part of the system is a camera capable of receiving the wireless transmission. When the camera is brought into the vicinity of the booth and captures an image of the product, a trigger signal from the camera initiates transmission of the wireless signal from the tradeshow booth. The camera then stores the product data with the image or stores a URL address that can direct the user to more information via the internet.

EP patent application No. 640,938 describes a personalized image recording system intended to create still images or video collections for guests of amusement parks. Each guest is associated with a unique identifier in the form of a readable tag worn by the guest. When the tag is brought into the vicinity of an attraction, the tag triggers a camera located at the attraction to capture an image, e.g., of the guest. A communications network interconnects the cameras and tag readers with a central control system that creates collections of images, including the captured images and other prerecorded stock footage. The control system arranges the images, according to preferences of the guest, into collections that capture the experience of visiting the amusement park.

Digital images, captured by either a digital camera or digitized from images captured on film, can thus be used to create multimedia files. These files combine still images and other types of data such as text, graphics, audio and video. Gathering the extra digital information needed in creating a multimedia file is a time-consuming process. The Internet and World Wide Web has made that process easier, but much of the content useful for the multimedia files is copyrighted and not readily available on the Internet sites. Moreover, the user needs a multimedia computer to put the information together. The user also needs to locate the URL addresses of these information sites.

A particular problem is that the volume of information can overwhelm the casual user who is trying, e.g., to assemble a record associated with a particular event, say a visit to a theme park or a site in the National Park system. It would be desirable to find a convenient way to combine the information handling capability of modern cameras with image recording so that information relevant to a user's interests can be easily requested and accessed about a photographed item.

SUMMARY OF THE INVENTION

The present invention is directed to overcoming one or more of the problems set forth above. Briefly summarized, according to one aspect of the present invention, a photographic system involves the collection of data from a scene, e.g., an visitor attraction site, that is capable of interactive communication with a user. The attraction site stores content data related to the site, and the user communicates with the attraction site through a camera capable of communication with the site. Besides capturing an image associated with the site, the camera stores predetermined personality data that relates an interest of the user to at least a portion of the content data and includes means for transferring the personality data to the attraction site. The camera further includes means for receiving and displaying the portion of the content data from the attraction site, and a user interface for selecting from the displayed content data that part which the user wants to keep.

In a further embodiment, the user of a camera interactively communicates with one or more attraction sites linked to a server and defining therewith a site/server subsystem. The site/server subsystem comprises means for storing content data related to the site, usually resident on the server, and communication means, usually resident at the attraction site, for receiving communications from the camera and for transferring the content data to the camera. Besides capturing an image associated with the site, the camera includes means for storing predetermined personality data that relates an interest of the user to at least a portion of the content data and communication means for transferring the personality data to the site/server subsystem.

The advantage of the invention is that it provides a convenient way to combine the information handling capability of modern cameras with image recording so that information relevant to a user's interests about a photographed item can be easily requested and accessed. In particular, it allows a visitor to customize the information available for downloading at an amusement site to a specific set of interests, and to combine that information with the specific pictures that the visitor has captured. The result is a unique product that relates the experience of visiting an amusement park or the like to an individual set of interests.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing film or electronic sensors are well known, as are networked communication systems, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

Figure 1:
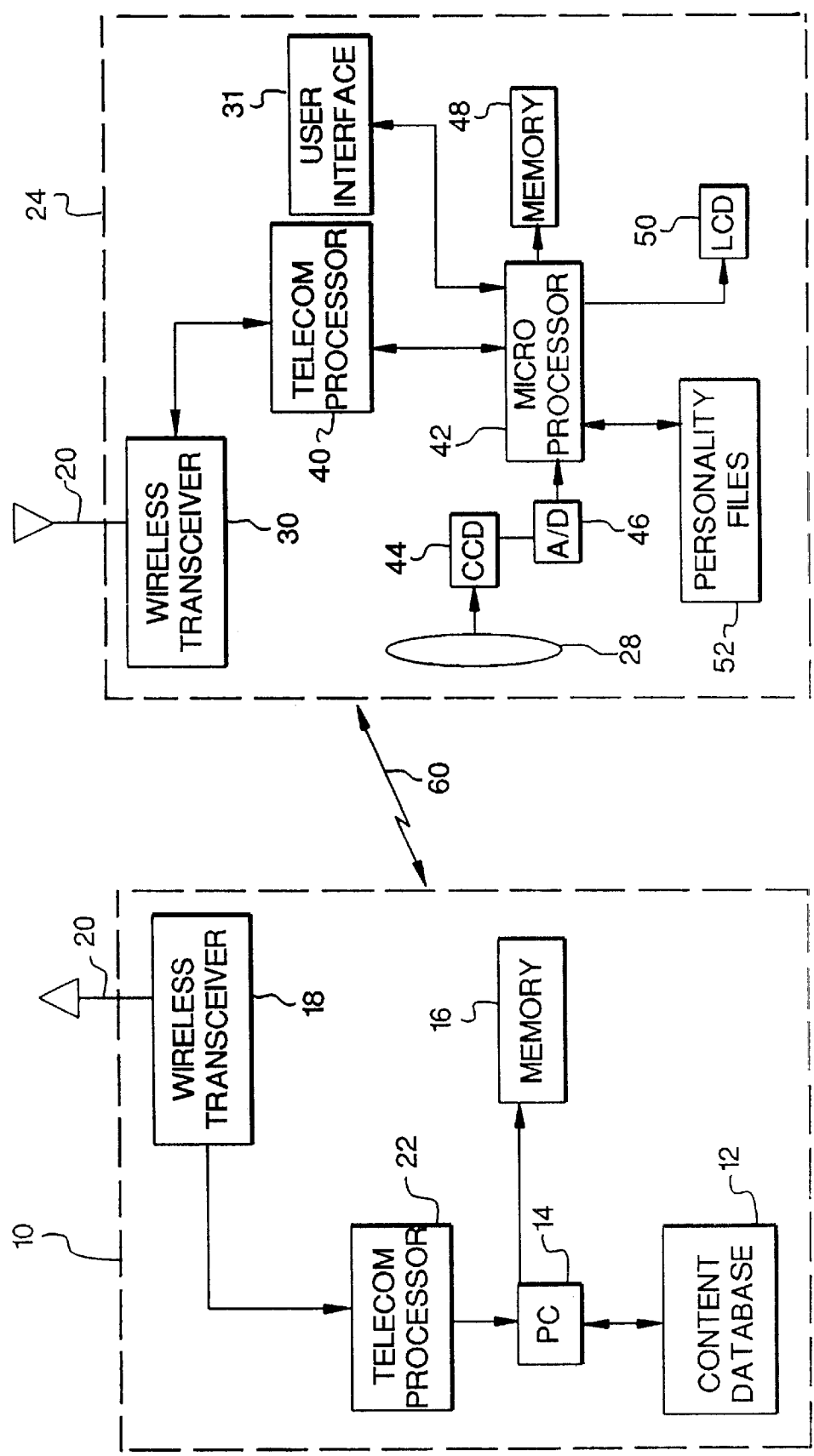
FIG. 1 is a block diagram of a first embodiment of a photographic and data transmission system according to the invention.

Beginning with FIG. 1, a first embodiment of the photographic and data transmission system is shown to include two main parts, or subsystems. The first part of FIG. 1 is a wireless communication component located at an attraction site 10, also referred to herein as an "image spot". An image spot is a specific location where a picture is likely to be taken, and additionally where a computer and a wireless communication system may be located. Such spots would include user accessible viewing points within theme parks, amusement parks, sporting sites, National Park system sites, and the like. The image spot 10 in this embodiment is a stand-alone unit which includes a content database 12 for storing digital data, controlled with a personal computer 14 which contains a memory unit 16. A wireless communication subsystem includes a wireless transceiver 18 interchanging signals with an antenna 20 and a telecommunications processor 22. As a feature of the invention, the content database 12 contains a variety of information about the feature that qualifies as an image spot, and specifically information that would be of interest to a variety of viewers. Given its transmission capability, the image spot 10 functions as a "communicating scene" specifically by transmitting scene information of interest to a particular user.

Figure 3:
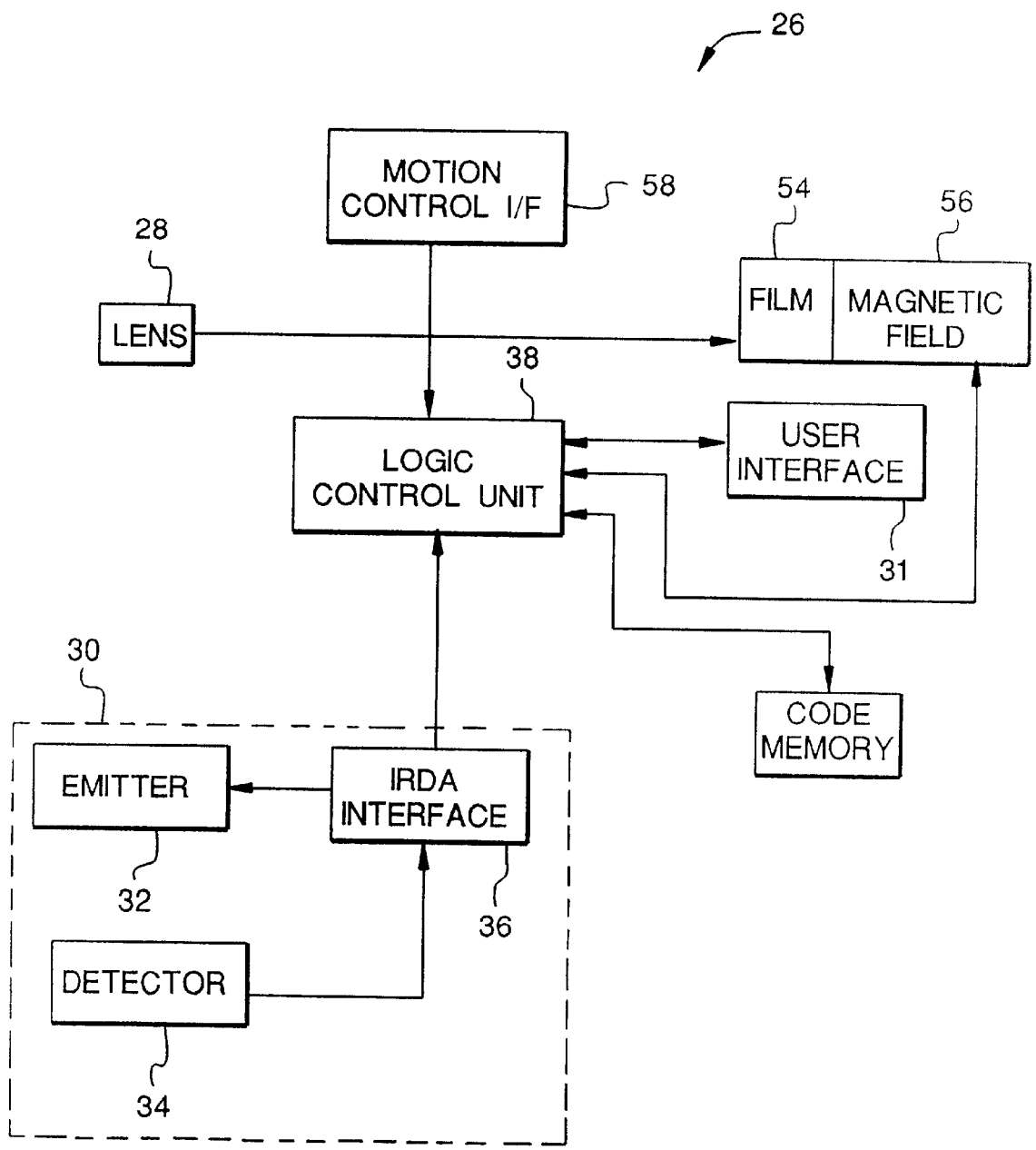
FIG. 3 is a block diagram of a film camera that can be used in the systems shown in FIGS. 1 and 2.

The second part, or subsystem, of the photographic and data transmission system is a camera 24. Preferably, the camera is either a digital camera 24 as shown in FIG. 1 (such as a Kodak DC120™ digital camera) or an Advantix™ film camera 26 as shown in FIG. 3 (such as a Kodak Advantix™ 3700 camera). As shown in FIGS. 1 and 3, both types of cameras capture an image of an object through a lens section 28, and include a transceiver section 30 for communicating with the image spot 10. Both include a user interface 31 for communicating user commands to the camera, such as the desire to capture an image, and some type of processing modality, such as a microprocessor 42 or a logic control unit 38. As shown in more detail in FIG. 3, the transceiver section 30 may include an infrared emitter 32 and an infrared detector 34 connected through a conventional IrDA interface 36 to the logic control unit 38. The transceiver section 30 in the digital camera 24 may also include an IR emitterdetector system as shown in FIG. 3; alternatively, both cameras may include other types of transceivers, such as a radio-frequency (RF) transceiver system. For the digital camera shown in FIG. 1, the transceiver signal is intercommunicated between a telecommunications processor 40 and the microprocessor 42.

Referring to FIG. 1, an image is focused by the lens section 28 upon a charge coupled device (CCD) image sensor 44, which generates an image signal from the captured image. The image signal is converted into a digital signal by an A/D converter 46, processed by the microprocessor 42 and stored in a memory 48. The memory 48 may take any number of conventional forms, including a removable memory such as a memory card or a small hard drive card. The image signal, as well as content data related to the image, may be viewed on a liquid crystal display (LCD) 50. As a further feature of the invention, personality data descriptive of the user is stored in a personality file 52. As will be explained, the personality data relates one or more interests of the user to at least a portion of the content data in the content database 12 at the image spot 10. The personality data is transferred through the transceiver section 30 to the image spot 10, and integrates with the content data base 12 to determine the desired content for the particular captured image.

In the case of the film camera 26 shown in FIG. 3, the lens section 28 forms an image upon a photosensitive film 54. The film 54 preferably is an Advantix™ film including a magnetic portion 56 which can store the personality data, as well as additional data received by the transceiver section 30. Recording on the magnetic portion 56 is coordinated with a motion control interface 58 such that recording occurs when the film 54 is in motion, e.g., during film advance between exposures.

When the digital camera 24 or the film camera 26 is brought into the communicating range of the image spot 10, and a photograph is taken at that spot, an exchange takes place between the camera and the image spot 10 via a wireless link 60. More specifically, the camera 24 or 26 communicates the personality data in the personality file 52 to the image spot 10. The purpose of the personality file 52 is to indicate to the image spot 10 the type of data that the user is interested in. Such data could be information such as graphics, photographs, video/audio clips or reference material associated with the particular attraction site, e.g., a site at a theme park. The relevant information, which may be the actual content information or a pointer or like descriptor indicative of the content, is then communicated by the image spot 10 to the camera 24 or 26 via the wireless link 60 and, if the camera has the capability, may be viewed by the user on the LCD screen 50 (e.g., available on the digital camera 24). Besides actual content information, the viewed information could be a list indicative of the content. If the user wants to save the data, acceptance is signaled through the user interface 31 and the data is stored in the memory in the camera. In the digital camera 24 the data is stored in the memory 48 along with the digital image, and in the film camera 26 the data is stored on the magnetic strip 56 along with a latent image on the film 54. Alternatively, a URL address for the data can be stored in the respective memory and the data may be downloaded via the internet at a later time. Besides indications of personal preference, the personality file 52 can also include account and transaction information, which will pay for the material subject to sale, such as copyrighted material.

For both types of cameras, the captured image is stored in an image recording memory (the memory 48 in the digital camera 24 or the magnetic region 56 in the film camera 26), where the selected content data is also stored and therewith appended to or associated with the image. In typical usage of this system, the user actuates a capture release in the user interface 31, the respective camera captures the selected image, the personality data is communicated to the image spot 10, and content data that correlates with the personality data is communicated back to the camera. In particular, the personality data would ordinarily not be transmitted to the image spot until the user actually captures an image. This allows the user to point the camera and to frame an image without initiating any data transfer between the camera and the image spot. Consequently, although it does not have to be the case, the image capture and the data transfer ordinarily occur contemporaneously, and substantially simultaneously. With the digital camera 24, the data transfer results in display of the correlated content, and the selected data is appended to the image data somewhat later in time. With the film camera, the data transfer results in appending the correlated content, or pointers to that content, to the image contemporaneously with image capture. (Although not specifically disclosed, it should be understood the camera may include a mode switch or the like so that the inventive features can be disabled, and the camera can operate conventionally to capture an image without triggering any communication between the camera and the image spot.)

Figure 2:
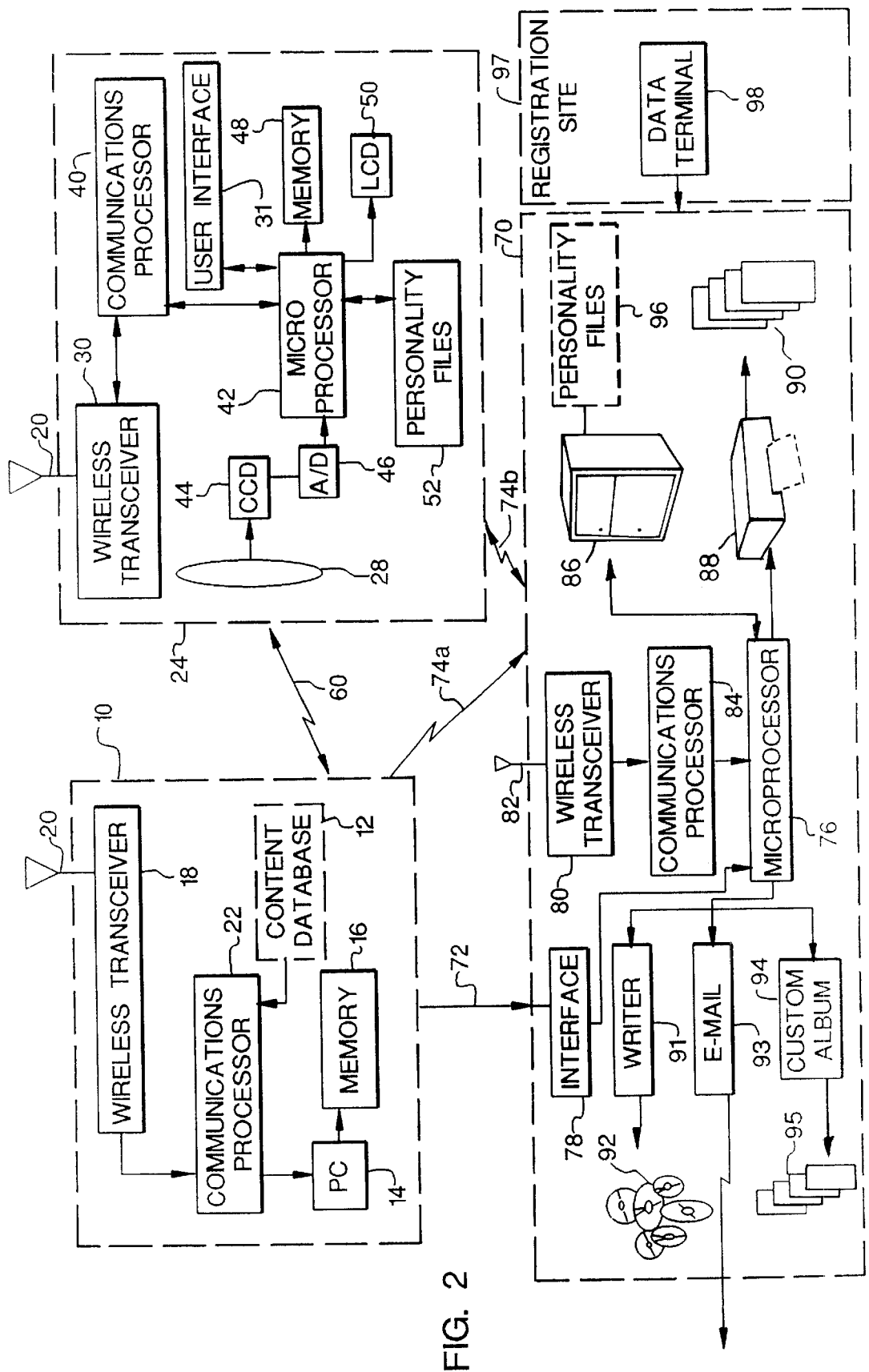
FIG. 2 is a block diagram of a second embodiment of a photographic and data transmission system according to the invention.

In FIG. 2, the system is part of an interactive telecommunication network allowing a user of a camera to interactively communicate with desired attractions through an image server 70. In particular, the network includes one or more image spots 10 at corresponding attraction sites linked to the server 70 and defining therewith a site/server subsystem. The site/server subsystem includes, either at the image spot 10 or the image server 70, the memory for storing content data related to an image associated with the site and the means for interconnecting the content data with captured images. For example, in a networked system as shown in FIG. 2, the personality data in the personality file 52 in the camera 24 may only include a unique number identifying the user. Such a number can then be linked with actual (predetermined) interests in the image server 70. The central part of the site/server subsystem is the image server 70, which receives order information from image spots and cameras over an extended area, e.g., around a theme park.

As shown in FIG. 2, the image server 70 includes either wired or wireless links 72,74a,74b to the image spots and the cameras. The wired link 12 is applied to a microprocessor 76 through an interface 78, and wireless transmissions over the links 74a, 74b are received by a transceiver 80, through an antenna 82, and applied to a communications processor 84, which decodes the transmissions and applies the decoded transmissions to the microprocessor 76. The wireless link 74a is mainly intended to transfer content data and personality data between the image spot 10 and the image server 70. The wireless link 74b serves as a conduit for transfer of image data between the camera 24 and the image server 70. The content data is preferably stored in a content database 86 in the image server 70, although some, or all, content data may be stored at the image spot 10 in its content database 12 (which is shown in broken line in FIG. 2 to indicate that its presence is optional). The image server 70 also includes a printer 88 for producing photographic images 90. In addition, the microprocessor 76 drives a writer 91 to provide customized media 92, such as compact disks (CDs), digital video disks (DVDs), or the like; an E-mail interface 93 to generate E-mail messages; and a custom album processor 94 to generate customized album prints 95.

The personality file of each user is input to the image server 70 at a registration site 97, such as an entrance booth at a theme park, where each user can directly interact with the image server 70 through an interactive data terminal 98, e.g., by entering biographical detail and responding to predetermined prompts based on typical visitor interests. This could also be done ahead of time via, e.g., e-mail or with the advance purchase of tickets. Then, in the interactive network shown in FIG. 2, a plurality of registered users will capture their images at the various attraction sites, view the extra content requests sent to them from the image spot database 12 (as in FIG. 1) or the content database 86 in the image server 70, and order a set of services such as albuming or prints from the image server 70. The image server 70 keeps track of all of the data and services requested during each user's visit to the park via the wired or wireless communication link with the image spot 10. At the end of the visit, the users can decide what services or content they want to order, and order those services and specify their method of delivery (e.g. via mail or e-mail). Orders could be placed upon leaving the theme park, e.g., at the registration site 97 or from a local hotel room or via the internet. The image server 70 may also receive the captured digital images via the same wireless link 74b from each user's digital camera 24 and combine these images with the requested content from the content databases 12 or 86. In cases where the image server 70 is out of the wireless range to the camera represented by the wireless link 74b, all the communication, including images, may be routed through the wired telecommunication link 74a between the image spot 10 and the image server 70.

An important aspect of the invention is the provision of a customized personality file, which is either stored in the camera according to the embodiments shown in FIGS. 1 and 2, or optionally stored in the image server 70 in a personality file memory 96 (together with a user ID in the camera) according to a variation shown in connection with FIG. 2. The information stored in the personality file is used by the respective processors 76, 14 in the image server 70 and the image spot 10 to choose content data as the user visits respective image spots and capture images; in the case of the networked system shown in FIG. 2, the personality file is also used to later combine the chosen content data with the user's own images. The personality file contains a collection of information designed to inform an image spot about a visitor's particular interests, and may include the following:

names of family members
    names of other important individuals addresses, phone numbers, E-mail addresses
ages (birth dates) of people in the file
educational backgrounds
specific interests—historical, natural, artistic, etc.
CPU at home/office
computer capability of named individuals
internetion-line capability(including E-mail)
purpose of the current visit
interest in movie snippets
interest in sound bites
and so on . . .

Interests can be derived from a variety of factors associated with the personality file. Besides a specific recitation of interests, the relative ages of the visitors can bias the content toward small children, adolescents, or adults. Content can automatically be tailored to those with home internet connections by, e.g., providing URL addresses. Educational backgrounds, e.g., elementary vs. graduate school or technical vs. artistic, can be used to sort and assign content— e.g., a technical presentation of the creation of a site vs. an artistic presentation of the architecture of the site. Movie clips and sound bites can be added depending on the wishes of the visitor. The aforementioned information is not intended to be exhaustive and many other types and usages of personality information would come to mind and are intended to be within the scope of this invention.

As also shown in FIG. 2, the personality file may be generated at some early stage in the visit to an attraction (such as at the registration site 97) and stored in a personality file memory 96 in the image server 70. In this scenario, the personality file 52 in the camera 24 or 26 would merely store a personal identifier that uniquely relates the camera 24 or 26 to the particular personality file 96 in the file server 70. This personal identifier would then be exchanged with the image spot 10 in order to access the pertinent parts of the content data base 86 in the image server 70.

The content databases in the image spot 10 and the image server 70 contain large collections of information that would satisfy the interests of a large number of users with different interests. Such content information may include the following:
collections of images
collections of sounds
collections of movies
multimedia content
reference information—historical, natural
URLs for further related information
cost information
and so on . . .

The collections of images, sounds, and movies may be further subdivided into more specific collections directed toward groups, e.g., children, adolescents, and adults, or to subject matter, e.g., technical, artistic, natural, literary, architectural, personal preferences (e.g., sports, cars, recipes) and so on. Multimedia content may be provided according to the above subdivisions, e.g., textual material suitable for different age groups or for outlining different subject matter. The aforementioned content information is not intended to be exhaustive and many other types and usages of content information would come to mind and are intended to be within the scope of this invention. Other conventionally available information, such as date, time and global positioning (GPS) data, may also be provided by the camera independently of the personality files.

Figure 7:
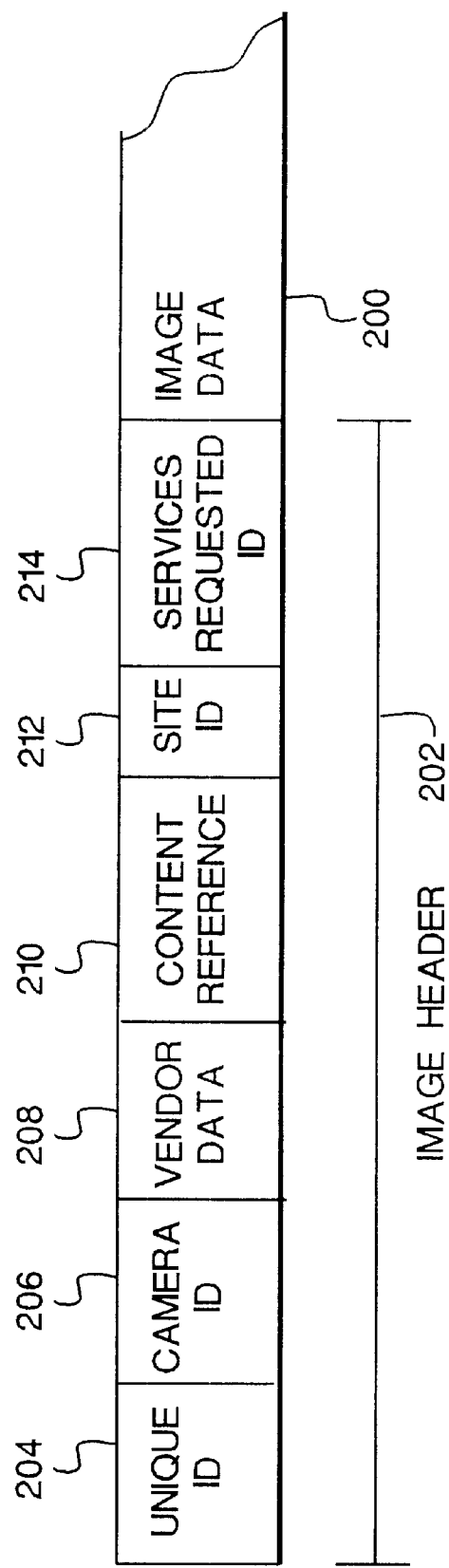
FIG. 7 is a diagram of an exemplary data structure useful with the photographic and data transmission systems shown in FIGS. 1 and 2.

If a user's personality file is registered and stored at a central location, such as the registration site 97, then a file structure may be established at the registration site 97 (in combination with the user interface 98) in which part of the personality file is a unique identification number (UID) for the camera. An example of such a structure is shown in FIG. 7, which shows the structure for a film or digital camera file header. In either case, the file includes an image data region 200 and an image header 202. In the image header 202, a unique ID field 204 assigns a unique entity to each camera by using a large number for the ID. A Camera/media ID field 206 represents the model, S/N, etc. for the camera and the film (if a film camera is used). The camera/media ID field 206 can be used to indicate what the camera system is capable of doing, e.g., whether the camera has an image review capability, such as the LCD 50. A vendor ID field 208 is a number that is used to represent a vendor (camera manufacturer) such as Eastman Kodak Company, and allows the unique ID field 204 and Camera ID field 206 to be unique to and assignable by the specific vendor (otherwise vendors would have to coordinate unique numbers). It can also be used to recognize special processing needs for the vendor.

If the camera is to store content data, a content reference field 210 may be used to reference to at least some of the chosen content data, such as multimedia data, that is stored in the server 70(e.g., sound #34356 or image #32349), so that large data files do not have to be stored in the camera It can also be an address pointing to the data in the content data base 86 in the server 70, similar to a URL address, or it can be an actual URL address. A site ID field 212 refers to the owner of the content. If images in one camera were taken, e.g., to different theme parks, the site's ID reference number would make the content reference unique to each park. A services requested ID field 214 would reference, by image, special services such as albums, enlargements of the reviewed images or content. While FIG. 7 suggests one file structure, the actual presence of data will depend on system capabilities and the type of camera used in the system.

Figure 4:
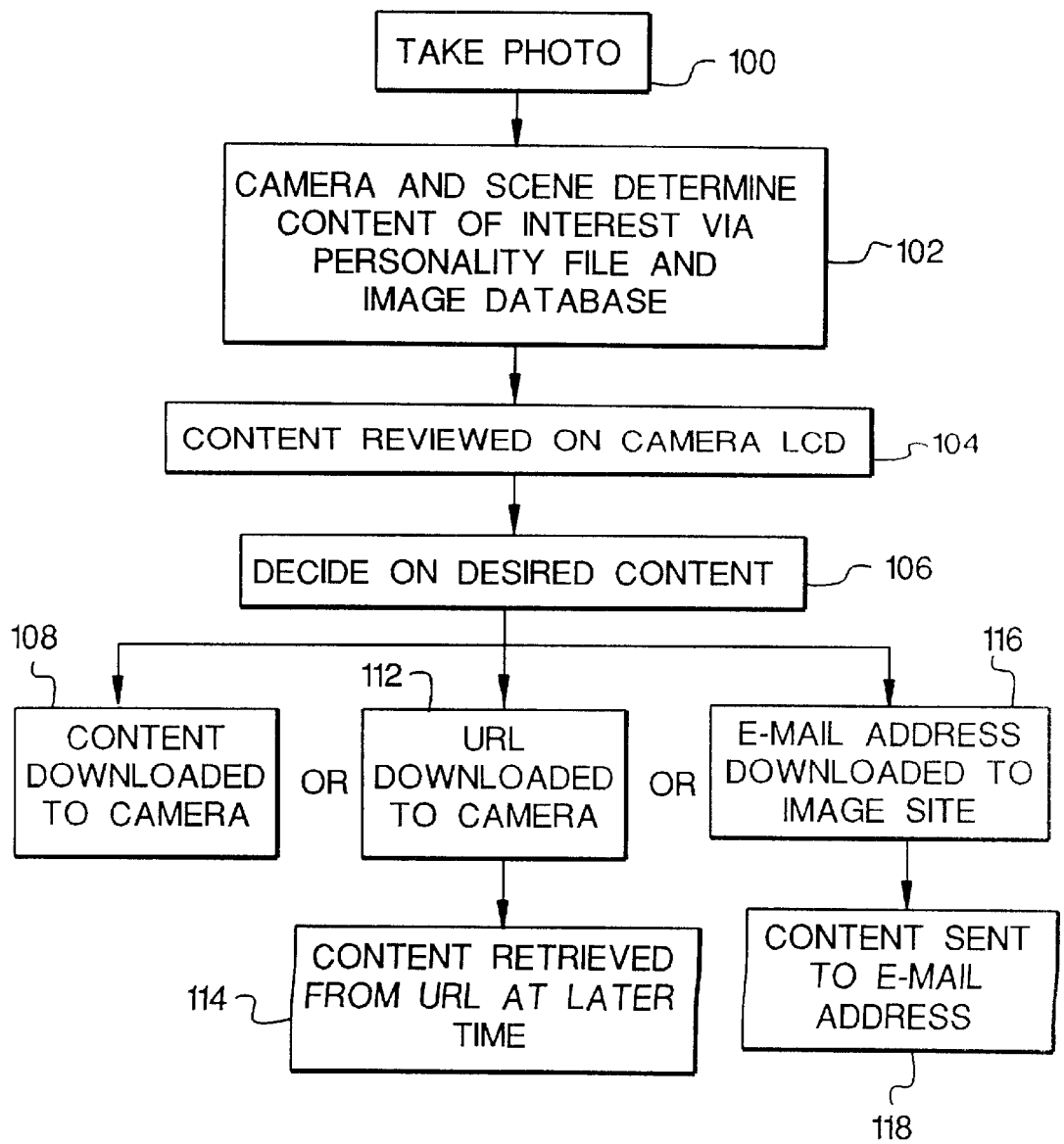
FIG. 4 is a flow diagram of the operation and downstream data processing of the photographic and data transmission system of FIG. 1 as used in connection with a digital camera.

In operation with a stand alone image spot and a digital camera, as shown in FIG. 4, a photograph is taken at the image spot 10 using the digital camera 24 (step 100). The communication between the image spot 10 and the camera 24 using the data stored in the personality file 52 will determine what extra data is going to be used in the extra services requested by the user (step 102). This content can be uploaded to the camera 24 and selected using the preview function of the camera's LCD screen 50 (step 104). After the data is chosen (step 106), it is uploaded to the camera 24 using the wireless link (step 108). Alternatively, a reference address to the chosen content can be stored in a file header in the camera 24. In addition, a digital camera user could elect to download the URL address of the chosen content data (step 112) for subsequent retrieval (step 114) or to download the user e-mail address to the image spot 10 (step 116), and the extra data chosen is then sent to the users e-mail account (step 118).

Figure 5:
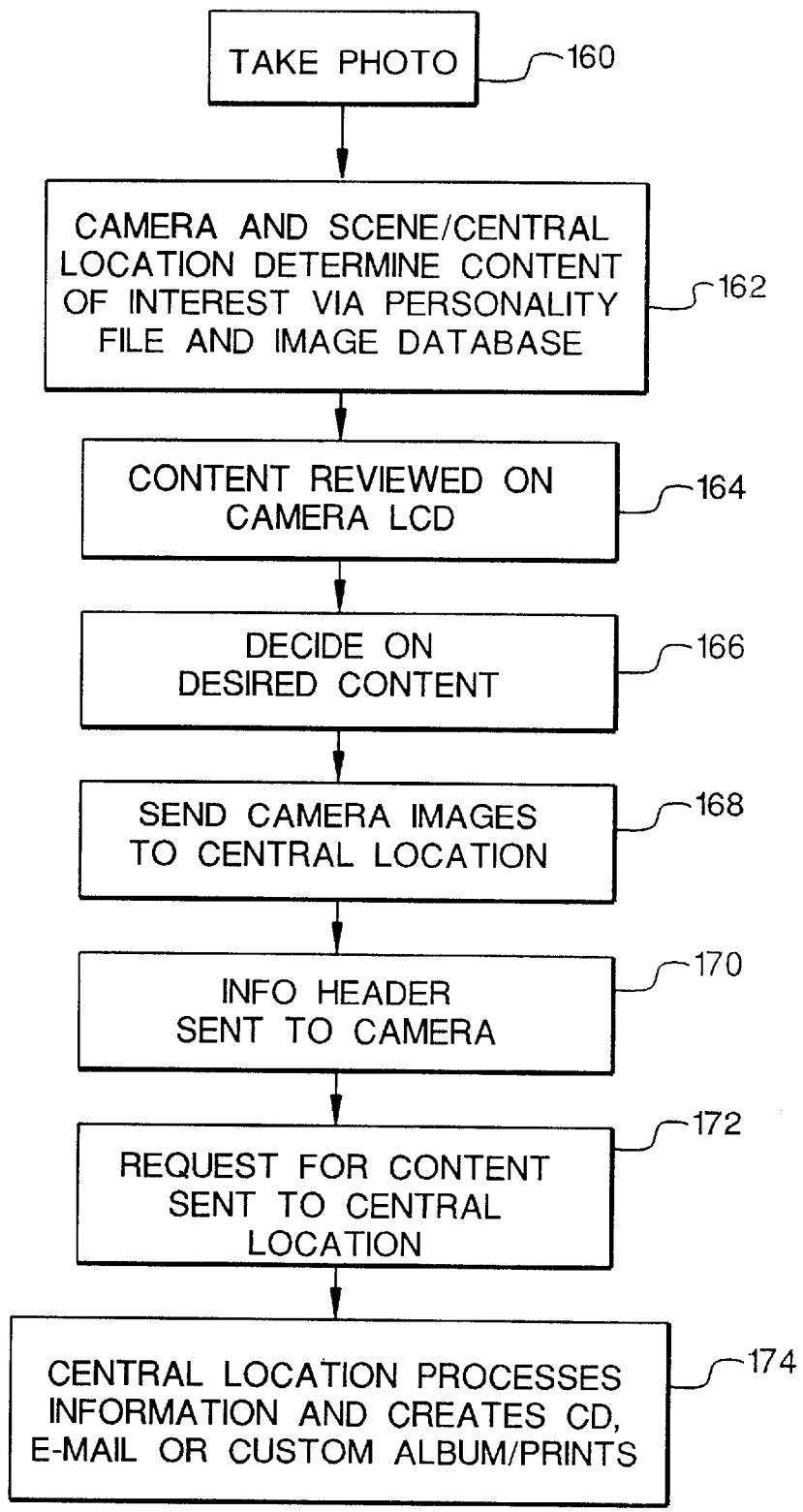
FIG. 5 is a flow diagram of the operation and downstream data processing of the photographic and data transmission system of FIG. 2 as used in connection with a digital camera.

In operation with a digital camera in a networked system as shown in FIG. 5, the photograph is taken at the image spot 10 using a digital camera (step 160). The communication between the image spot 10, the camera 24, and the image server 70 using the data stored in the personality file will determine what extra data is to be used in performing the extra services requested (step 162). This extra data or content may be reviewed on the LCD display on the camera (step 164), and the user chooses the desired data (step 166). The image data for the captured images are sent to the image server 70 (step 168), and the information header of these digital files are then sent to the camera where they are stored in memory (step 170). The request for this data is then transmitted to the image server 70 at a central location (step 172) via a communication link (wired or wireless). At the central location, the images and other content are combined to create the albums and multimedia files as desired, including custom CDs, DVDs (digital versatile disk) or E-mail.

Figure 6:
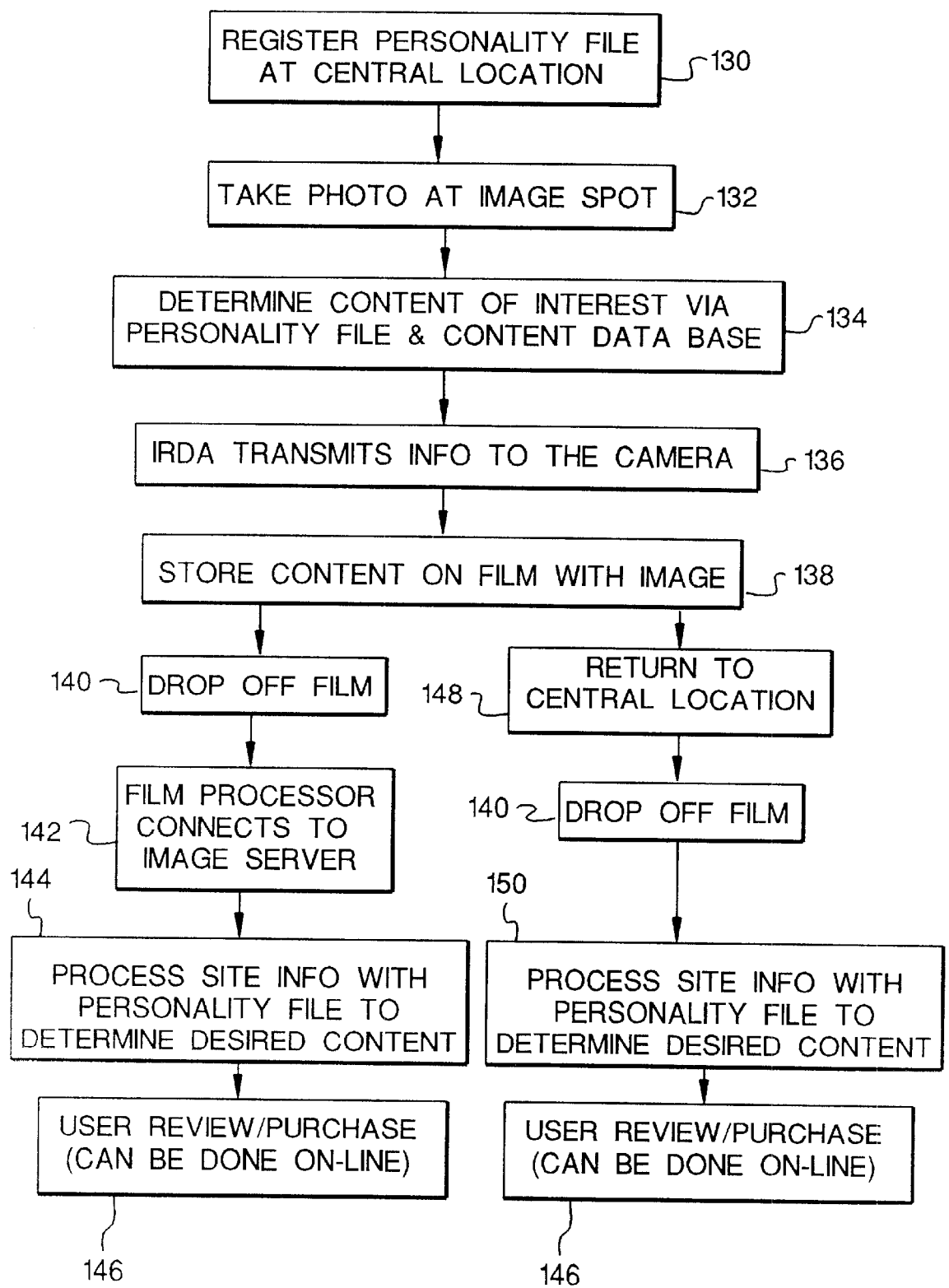
FIG. 6 is a flow diagram of the operation and downstream data processing of the systems shown in FIGS. 1 and 2 as used in connection with a film camera.

In operation with a film camera 26, as shown in FIG. 6, an user's personality file is registered and stored at a central location, such as the image server 70 (step 130). Part of this personality file is a unique identification number (UID) for the camera as shown in FIG. 7. The images are taken using the film camera 26 at the image spots 10 around, e.g., the theme park (step 132). The communication between the image spot 10, the camera 26, and the image server 70 using the data stored in the personality file 52 will determine what extra data is going to be used in the extra services requested by the user (step 134). The extra information (or pointers to the information in the image server's database 86) is chosen at these image spots 10 and transmitted via the IrDA wireless link to the camera (step 136). The information or the location of this extra data (in the image server's database 86) is stored on the magnetic portion 56 of the film 54 (step 138). The film is then dropped off (step 140) at a processing center, where the film is processed and the extra services such as albuming and multimedia file creation are performed using the information saved on the magnetic coating of the film (step 144). If the information saved on the film is the location of the data, that data is downloaded after a telecommunication link (step 142) is established between the image server 70 and the processing center. If the processing center is the image server center (step 150), the information is on site, and there is no need for a telecommunication link. In either case, the user reviews the product, which can be done on-line (step 146).

The invention has been described with reference to a preferred embodiment. However, it will be appreciated that variations and modifications can be effected by a person of ordinary skill in the art without departing from the scope of the invention.

PARTS LIST 10 image spot
12 content database
14 personal computer
16 memory unit
18 wireless transceiver
20 antenna
22 telecommunication processor
24 digital camera
26 film camera
28 lens section
30 transceiver section
31 user interface
32 infrared emitter
34 infrared detector
36 IrDA interface
38 logic control unit
40 telecommunications processor
42 microprocessor
44 CCD
46 A/D converter
48 memory
50 LCD
52 personality file
54 film
56 magnetic portion
58 motion control interface
60 wireless link
70 image server
72 wired link
74a wireless link
74b wireless link
76 microprocessor 76
78 interface
80 transceiver
82 antenna
84 communications processor
86 content data base
88 printer
90 prints
91 CD writer
92 CDs, DVDs
93 E-mail interface
94 custom album processor
95 custom albums
96 personality file memory
100–118 steps
130–146 steps
160–174 steps
200 image data region
202 image header
204 ID field
206 camera/media ID field
208 vendor ID field
210 content reference field
212 site ID field
214 services requested ID field

What is claimed is:

1. A photographic system allowing a user of a camera to interactively communicate with desired attractions, said system comprising:

one or more attraction sites having:
means for storing content data related to the site; and
a transceiver for receiving communications from the camera and for transferring the content data to the camera;

said camera comprising:
means for capturing an image associated with the site;
means for storing predetermined personality data that relates an interest of the user to at least a portion of the content data; and
means for transferring the personality data to the attraction site.

2. A system as claimed in claim 1 wherein the transceiver at the attraction site transfers the portion of the content data to the camera responsive to receipt of the personality data, and the transferring means at the camera comprises a transceiver for receiving the portion of the content data from the attraction site.

3. A system as claimed in claim 2 wherein the camera further includes means for displaying the portion of the content data received from the attraction site.

4. A system as claimed in claim 3 wherein the camera further includes a user interface for selecting from the displayed content data that part which the user wants to keep.

5. A system as claimed in claim 4 wherein the camera further generates a signal indicative of the displayed content data which the user wants to keep and the transceiver at the camera further transmits the signal to the attraction site.

6. A system as claimed in claim 5 wherein the transceiver at the attraction site transfers the content data which the user wants to keep to the transceiver at the camera.

7. A photographic system allowing a user of a camera to interactively communicate with desired attractions, said system comprising:
- one or more attraction sites linked to a server and defining therewith a site/server subsystem, said site/server subsystem comprising:
- means for storing content data related to the site; and
- communication means for receiving communications from the camera and for transferring the content data to the camera;
- said camera comprising:
- means for capturing an image associated with the site;
- means for storing predetermined personality data that relates an interest of the user to at least a portion of the content data; and
- communication means for transferring the personality data to the site/server subsystem.

8. A system as claimed in claim 7 wherein the communication means at the attraction site transfers the portion of the content data to the camera responsive to receipt of the personality data, and the communication means at the camera further receives the portion of the content data from the attraction site.

9. A system as claimed in claim 8 wherein the camera further includes means for displaying the portion of the content data received from the attraction site.

10. A system as claimed in claim 9 wherein the camera further includes a user interface for selecting from the displayed content data that part which the user wants to keep.

11. A system as claimed in claim 7 wherein the means for storing the content data resides in each attraction site.

12. A system as claimed in claim 7 wherein the means for storing the content data resides in the server.

13. A system as claimed in claim 7 wherein the camera includes means for transmitting the captured images to the site/server subsystem.

14. A system as claimed in claim 13 wherein the site/server subsystem further includes a processor for combining the captured images with the content data.

* * * * *